United States Patent
Jantunen et al.

(10) Patent No.: US 8,674,808 B2
(45) Date of Patent: Mar. 18, 2014

(54) INTERROGATION OF RFID COMMUNICATION UNITS

(75) Inventors: Joni Jorma Marius Jantunen, Helsinki (FI); Jaakko Valtteri Varteva, Veikkola (FI); Juha-Matti Mikael Tuupola, Tampere (FI)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 12/918,237

(22) PCT Filed: Feb. 29, 2008

(86) PCT No.: PCT/FI2008/050100
§ 371 (c)(1),
(2), (4) Date: Aug. 18, 2010

(87) PCT Pub. No.: WO2009/106672
PCT Pub. Date: Sep. 3, 2009

(65) Prior Publication Data
US 2010/0328043 A1    Dec. 30, 2010

(51) Int. Cl.
*H04Q 5/22* (2006.01)

(52) U.S. Cl.
USPC ..... 340/10.3; 340/10.1; 340/10.2; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385; 375/354; 370/230; 370/280; 370/329; 370/350; 455/41.1; 455/41.2; 455/133; 455/434

(58) Field of Classification Search
USPC ............... 340/10.1–10.6, 572.1–572.9; 235/75–385; 370/230, 280, 329, 350; 375/354; 455/41.1, 41.2, 133, 434
See application file for complete search history.

(56) References Cited

U.S. PATENT DOCUMENTS

| | | | | |
|---|---|---|---|---|
| 4,041,391 A | * | 8/1977 | Deerkoski | 375/281 |
| 4,718,109 A | * | 1/1988 | Breeden et al. | 455/503 |
| 5,726,630 A | | 3/1998 | Marsh et al. | |
| 6,130,602 A | * | 10/2000 | O'Toole et al. | 340/10.33 |
| 6,157,230 A | * | 12/2000 | O'Toole et al. | 327/156 |
| 6,198,332 B1 | * | 3/2001 | O'Toole et al. | 327/356 |

(Continued)

FOREIGN PATENT DOCUMENTS

| | | | | |
|---|---|---|---|---|
| EP | 1 762 960 | | 3/2007 | |
| EP | 1812909 A2 | * | 8/2007 | G06K 7/00 |

(Continued)

OTHER PUBLICATIONS

International Search Report of PCT/FI2008/050100—Date of Completion of Search: Nov. 6, 2008.

(Continued)

*Primary Examiner* — George Bugg
*Assistant Examiner* — Paul Obiniyi
(74) *Attorney, Agent, or Firm* — Locke Lord LLP (57) ABSTRACT

A dual mode interrogation is carried out by sending narrow band radio frequency interrogation (RFID) signal for narrow band RFID communication units, the narrow band signal comprising substantially continuous periods, and by sending a high data rate RFID interrogation signal during the substantially continuous periods of the narrow band RFID signal so that two different types of RFID communication units are interrogated substantially simultaneously.

20 Claims, 4 Drawing Sheets

(56) References Cited

U.S. PATENT DOCUMENTS

| | | | |
|---|---|---|---|
| 6,198,357 B1 * | 3/2001 | O'Toole et al. | 331/57 |
| 6,316,975 B1 * | 11/2001 | O'Toole et al. | 327/156 |
| 6,351,190 B1 * | 2/2002 | O'Toole et al. | 331/57 |
| 6,384,648 B1 * | 5/2002 | O'Toole et al. | 327/156 |
| 6,480,143 B1 * | 11/2002 | Kruger et al. | 342/44 |
| 6,952,157 B1 | 10/2005 | Stewart et al. | |
| 6,995,655 B2 * | 2/2006 | Ertin et al. | 340/10.2 |
| 7,180,421 B2 * | 2/2007 | Pahlaven et al. | 340/572.1 |
| 7,253,717 B2 * | 8/2007 | Armstrong et al. | 340/10.2 |
| 7,280,525 B2 * | 10/2007 | Koo | 370/350 |
| 7,430,199 B2 * | 9/2008 | Fujita et al. | 370/350 |
| 7,444,127 B2 * | 10/2008 | Laroia et al. | 455/140 |
| 7,548,153 B2 * | 6/2009 | Gravelle et al. | 340/10.3 |
| 7,626,488 B2 * | 12/2009 | Armstrong et al. | 340/10.2 |
| 7,719,280 B2 * | 5/2010 | Lagae et al. | 324/322 |
| 7,755,491 B2 * | 7/2010 | Volpi et al. | 340/572.4 |
| 7,773,635 B2 * | 8/2010 | Eichinger et al. | 370/478 |
| 7,893,840 B2 * | 2/2011 | Volpi et al. | 340/572.4 |
| 7,969,923 B2 * | 6/2011 | Sorond et al. | 370/310 |
| 8,154,386 B2 * | 4/2012 | Kim et al. | 340/10.1 |
| 8,199,017 B2 * | 6/2012 | Rofougaran | 340/572.7 |
| 8,248,929 B2 * | 8/2012 | Sato et al. | 370/230 |
| 2002/0167372 A1 * | 11/2002 | Ishizaki et al. | 333/17.1 |
| 2003/0074035 A1 * | 4/2003 | Bornhoft et al. | 607/60 |
| 2003/0184402 A1 * | 10/2003 | Ishizaki et al. | 333/17.1 |
| 2004/0198222 A1 * | 10/2004 | Ertin et al. | 455/41.1 |
| 2004/0233889 A1 * | 11/2004 | Fujita et al. | 370/350 |
| 2004/0252724 A1 * | 12/2004 | Jou | 370/480 |
| 2005/0083180 A1 | 4/2005 | Horwitz et al. | |
| 2005/0232135 A1 * | 10/2005 | Mukai et al. | 370/208 |
| 2005/0233716 A1 * | 10/2005 | Laroia et al. | 455/133 |
| 2005/0261749 A1 * | 11/2005 | Bornhoft et al. | 607/60 |
| 2006/0052055 A1 | 3/2006 | Rowse et al. | |
| 2006/0097874 A1 | 5/2006 | Salesky et al. | |
| 2006/0103533 A1 * | 5/2006 | Pahlavan et al. | 340/572.1 |
| 2006/0103535 A1 * | 5/2006 | Pahlaven et al. | 340/572.1 |
| 2007/0140166 A1 * | 6/2007 | Eichinger et al. | 370/329 |
| 2007/0155315 A1 * | 7/2007 | Lee et al. | 455/11.1 |
| 2007/0155443 A1 * | 7/2007 | Cheon et al. | 455/572 |
| 2008/0018432 A1 * | 1/2008 | Volpi et al. | 340/10.3 |
| 2008/0024276 A1 * | 1/2008 | Volpi et al. | 340/10.1 |
| 2008/0024277 A1 * | 1/2008 | Volpi et al. | 340/10.1 |
| 2008/0024278 A1 * | 1/2008 | Volpi et al. | 340/10.1 |
| 2008/0252293 A1 * | 10/2008 | Lagae et al. | 324/318 |
| 2009/0045917 A1 * | 2/2009 | Volpi et al. | 340/10.1 |
| 2009/0059893 A1 * | 3/2009 | Jou | 370/350 |
| 2009/0110131 A1 * | 4/2009 | Bornhoft et al. | 375/354 |
| 2009/0186575 A1 * | 7/2009 | Cedo Perpinya et al. | 455/41.2 |
| 2010/0035611 A1 * | 2/2010 | Montojo et al. | 455/434 |
| 2010/0124183 A1 * | 5/2010 | Sorond et al. | 370/280 |
| 2010/0214071 A1 * | 8/2010 | Nagai et al. | 340/10.1 |
| 2010/0277286 A1 * | 11/2010 | Burkart et al. | 340/10.34 |
| 2011/0170476 A1 * | 7/2011 | Shapira et al. | 370/328 |
| 2011/0286369 A1 * | 11/2011 | Kosaka | 370/280 |
| 2012/0093042 A1 * | 4/2012 | Sorond et al. | 370/280 |

FOREIGN PATENT DOCUMENTS

| | | | |
|---|---|---|---|
| JP | 2009251630 A * | 10/2009 | |
| WO | WO 2006055431 | 5/2006 | |
| WO | WO 2006055431 A2 * | 5/2006 | |
| WO | WO 2006070237 | 7/2006 | |
| WO | WO 2009054547 A2 * | 4/2009 | H04L 5/06 |

OTHER PUBLICATIONS

Extended European Search Report for European Application No. EP 08 71 8553.4—Date of Completion of Search: Sep. 26, 2011, 7 pages.

* cited by examiner

INTERROGATION OF RFID COMMUNICATION UNITS

FIELD OF THE INVENTION

The present invention generally relates to interrogating Radio Frequency Identification (RFID) communication units. More particularly, though not exclusively, the invention relates to parallel scanning of different RFID communication protocols.

BACKGROUND OF THE INVENTION

Generally, RFID systems are expected to become ubiquitous so that it would be beneficial to integrate RFID readers into various devices such as mobile phones. However, an RFID reader consumes energy and shortens the battery charging cycle in battery operated devices. Most of the energy consumption caused by an RFID reader is caused by the need to perform repeated searching to identify proximate tags. Before accessing an RFID communication unit such as an RFID tag, a scan or interrogation procedure is performed. During the interrogation, proximate tags are searched with a reader by radiating electromagnetic fields at a suitable frequency band such that a proximate tag is able to draw sufficient power from the radiation to, for example, alter its back scattering so as to cause a response signal that is recognisable by the reader. Without interrogation, the tags remain silent and invisible to the reader. Hence, in order to provide a user experience of automated access resulting from bringing a tag and reader into a short mutual distance, frequent interrogation is required. For instance, for an access control system in which an RFID tag operates as a remote key that unlocks a door, the interrogation should be repeated a number of times each second or the system appears unreliable to the user. As each interrogation consumes a given amount of energy, the power draw of the interrogations is directly proportional to the frequency at which the interrogations are performed.

There may also be a need to scan tags of more than one RFID system as different RFID systems are employed for different purposes. Among the most prominent RFID systems there are Near Field Communication (NFC) and EPCGlobal (EPC refers to Electronic Product Code) systems which use different frequencies or frequency bands and which also have regionally differing frequency variants according to national or regional frequency allocations. In order to scan different types of tags, correspondingly multiplied number of scans is required, with consequently increased battery draining.

Another problem involved with integration and use of various RFID systems in mobile phones relates to the co-operation of radio transceivers on Ultra High Frequency (UHF) band. For example, the RFID reader transceivers operating according to EPCGlobal standard and GSM transceiver (900/850 MHz) operate on frequency bands which are very close to each other. It may be very difficult to provide sufficient isolation between such two systems especially when using a relatively small device such as a mobile phone to host an RFID reader. As result, the use of such different system communicating substantially within common frequency band must be interleaved in time. The time interleaving is particularly challenging in connection with scanning for proximate tags when GSM time slots or any other communication on either uplink or downlink cause interruptions to the periods over which RFID scanning could be performed.

It is also challenging to integrate RFID readers into handsets to achieve reasonable isolation between transmitting and receiving paths of RFID TRx since transmission and reception should be active simultaneously and the transmission power easily leaks to the receiving path. This problem effectively restricts the operation range and/or data rate of RFID communications. One solution to this is to use one frequency band UHF 900 MHz for powering (900 MHz transmission only in reader) and to perform communication between the tag and reader on entirely different frequency band such as 3-5 GHz UWB band with time-multiplexed transmission and reception.

WO2006070237 is another application assigned to the patentee of this patent application. This publication describes an RFID system based on Impulse UWB (I-UWB) radios. In the publication, tags obtain operational power from signals transmitted by remote wireless communication devices. Tags may be partly powered by Bluetooth signals. However, even when Bluetooth signals are used to aid powering of tags, normal RFID interrogation signals are still needed and thus scanning different types of RFID tags has to be performed one by one for each type. Hence, numerous scans are needed.

In WO2006055431 an asymmetric communication method is described in which downlink communication and wireless power transmission from reader device to tag device are performed by using a narrow-band signal. The uplink communication from tag device to reader device is carried out over Time Domain Carrierless Impulse Radio (TDCIR). The publication also discloses separate embodiments in which a system communicates over a bi-directional Ultra Wide Band (UWB) link when the wireless power transmission is implemented by using a narrow-band signal on HF, UHF or any other frequency band or combination of the signals. While the method of the publication suggests that the system may be compatible with legacy RFID systems, separate interrogation for legacy RFID and TDCIR or UWB systems would be needed. It is also mentioned in third embodiment of this publication that other narrow-band signals than the one specified for interrogation can be used for powering of tags. However, a dedicated interrogation signal is always used by the reader to carry a clock signal which may be recovered in the tag from the incident wave.

It is an object of the invention to avoid or at least mitigate problems related to prior art and/or to provide a new technical solution.

SUMMARY

According to a first aspect there is provided an apparatus, comprising:
    a radio unit configured to transmit:
        a first radio signal on a first frequency band in order to interrogate first communication units compatible to a first radio frequency identification system; and
        a second radio signal on a second frequency band in order to interrogate second communication units compatible to a second radio frequency identification system, the second radio frequency band being different from the first frequency band;
    wherein the radio unit is further configured to interrogate the first and second communication units substantially simultaneously.

It should be appreciated that the substantially simultaneous interrogation of the first and second communication units refers to performing these interrogation processes in a time overlapping manner so that as a process these interrogations take place simultaneously, even though sending of actual interrogation signals may not be simultaneously transmitted.

The radio unit may be configured to send the second signal during periods in which the first radio signal is substantially continuous.

Advantageously, by using continuously powering periods of the first signal for interrogating the second RFID communication units, the second RFID units may obtain a clock reference from the apparatus when the second RFID units are being interrogated. By using continuously powering periods during interrogating of the first communication units, each of two different RFID systems need not be scanned separately and sequentially one after another. Hence, a substantial energy saving may be attained and/or the frequency at which RFID communication units are scanned or interrogated may be increased. Moreover, it is further realised that by performing simultaneously the first and second interrogation, it is possible to perform more interrogations within any given period of time. This may be particularly useful in applications where power saving is not necessarily of first priority but instead using RFID communication units should be particularly smooth so that a communication unit can be recognised by the apparatus in a very short period of time.

The continuously powering periods may refer to periods of non-modulated or substantially continuously powered intermediate periods between individual communication periods in which different signals are being sent or received. During the intermediate periods the first interrogation may not employ amplitude modulation. The second interrogation may be configured to interrogate the second communication units during one or more intermediate periods.

The second interrogation may be configured to synchronise the second communication units with the apparatus in terms of communication frequency.

The first RFID system may be configured to use amplitude shift keying (ASK) modulation for communication unit interrogation and to provide periods of continuous wave transmission as intermediate periods.

The first RFID system may operate on HF or UHF frequency band. The first RFID system may be a near field communication (NFC) or EPCGlobal system, for instance.

The second RFID system may be an RFID system that uses ultra wide band radio access such as an impulse ultra wide band (I-UWB) system.

Advantageously, it is possible to schedule communication with high data-rate I-UWB RFID communication units in such a way that the communication overlaps with another active RFID communication such as EPCGlobal or NFC communication without interfering the overlapped another active RFID communication. High data-rate I-UWB RFID utilizes a narrow-band signal similar to NFC or EPCglobal transmission for wireless power transmission and as a clock reference. Suitable periods of narrow-band RFID interrogation signals may be used for wireless power transmission and frequency synchronization of the high data-rate RFID system simultaneously with the narrow-band RFID interrogation.

The narrow-band modulation on UHF signal can be dedicated for parallel communication with legacy systems such as EPCGlobal tags, and parallel/simultaneous scan procedures and communication of high data-rate RFID system and EPC system is possible by using only one UHF transceiver.

According to a second aspect of the invention, there is provided a method according to attached claim 10.

According to a third aspect of the invention, there is provided a computer program according to attached claim 14.

According to a fourth aspect of the invention, there is provided an apparatus according to attached claim 15.

According to a fifth aspect of the invention, there is provided a method according to attached claim 20.

According to a sixth aspect of the invention, there is provided a program according to attached claim 23.

According to a seventh aspect of the invention, there is provided an apparatus according to attached claim 26.

A carrier embodying a computer program according to any aspect or embodiment of the invention may involve a digital data storage such as a data disc or diskette, optical storage, magnetic storage, holographic storage, phase-change storage (PCM) or opto-magnetic storage. The carrier may be formed into a device without other substantial functions than storing memory or it may be formed as part of a device with other functions, including but not limited to a memory of a computer, a chip set, and a sub assembly of an electronic device.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

According to at least one embodiment of the invention, it is possible to schedule interrogation for two different radio frequency identification systems in a parallel fashion. For instance, communication with a narrow band Radio Frequency Identification (RFID) system may overlap with a high data rate RFID system such as high data-rate impulse Ultra Wide Band (UWB) RFID tags which use a narrow band interrogation signals for powering and/or synchronising in such a way that the communication overlaps without operatively interfering with another active RFID system communication. The narrow band RFID system may be e.g. EPC-Global or Near Field Communication (NFC). In this document, an RFID communication unit refers to an element that is capable of communicating by means of RFID communications. Examples on typical RFID communication units include RFID tags, either passive or active i.e. self-powered and RFID readers. Unless otherwise stated, term tag may be read interchangeably with term communication unit.

Different embodiments of the invention as described illustrate methods which utilize efficiently resources in a mobile RFID reader by scheduling and overlapping RFID scanning functions and communication periods for different RFID systems. The scheduling of Impulse UWB (I-UWB) transceiver activation may be enhanced in a high data-rate RFID reader device, as an I-UWB transmission need not be limited only for the intervals between transmissions for another RFID system and also at least partly common radio circuitry (such as transmitter and/or antenna) may be used for transmission of two types of RFID radio signals. Since high data-rate RFID systems may use narrow-band signals only for wireless power transmission and/or as a mutual clock references from reader to tag, it is possible for a reader device to communicate simultaneously with narrow-band RFID communication units and high data-rate RFID communication units which are communicating over I-UWB radio links (on a different frequency band than what is used for narrow-band RFID).

Advantageously, as different types of tags may be simultaneously scanned, it may be possible to decrease the total energy consumption in a mobile RFID reader that needs to continually scan for multiple RFID systems.

Figure 1:
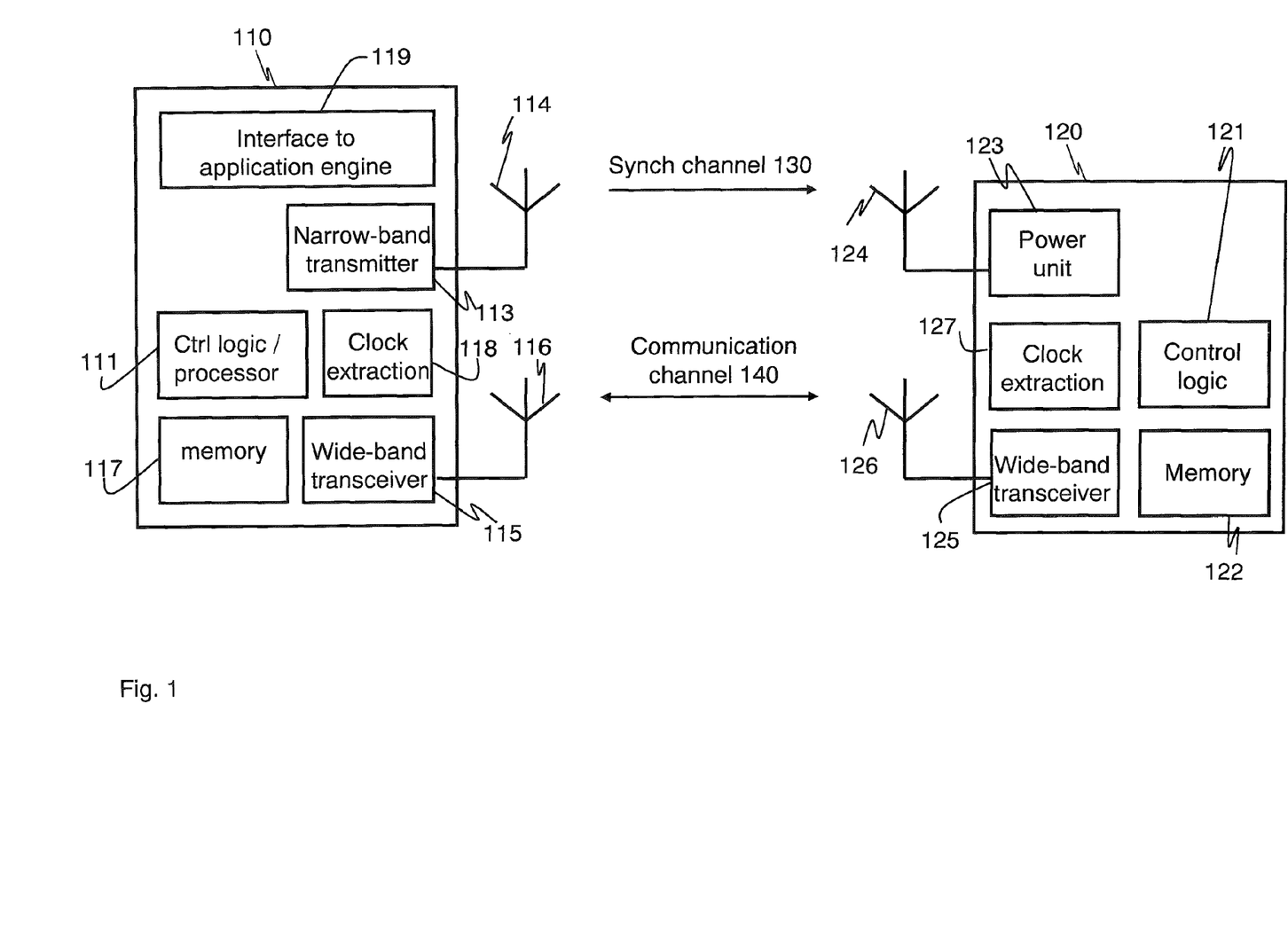
FIG. 1 shows a simplified block diagram of an exemplary high data-rate Radio Frequency IDentification (RFID) system according to at least one embodiment.

A simplified block diagram of the exemplary high data-rate RFID system according to at least one embodiment is presented in FIG. 1. The system comprises a host device 110, an RFID communication unit 120, a synchronisation channel 130 and a communication channel 140, which channels may be separated or overlapping in frequency. It is observed that while it may be simpler to implement embodiments with separated frequency, ultra wide band communication may be arranged in a manner which tolerates overlapping narrow band transmissions by narrow band RFID communications and which does not excessively interfere with the narrow band RFID communications. The host device may be a mobile telephone, game device, Personal Digital Assistant, or generally a portable or handheld device. The host device comprises a control processor 111, a synchronisation transmitter 113, a synchronisation antenna 114, a communication transceiver 115, a communication antenna 116, a memory 117, a clock extraction unit 118, and an application engine interface 119. In the host device, the processor 111 controls the general operation of the host device using the computer program code. The memory 117 is drawn as a common logical storage for both computer program code controlling the operation of the host device 110, for maintaining volatile work memory data and for holding a buffer memory for detecting response signals received on the communication channel 140 for the control processor 111 to determine the timing of a responsive RFID communication unit 120. The buffer may also function as a cache buffering data received from the RFID communication unit 120 until the host device can supply the data to application layer processing. The application engine interface 119 is an interfacing unit that is used to connect the host device 110 to the application engine.

The clock extraction unit 118 in the host device or reader may refer depending to embodiment to a clock extraction or local oscillator element. Namely, it is possible to implement the host device 110 such that the local oscillator signal that drives the narrow-band transmitter 113 is physically connected to the communication transceiver 115. In this case no clock extraction may be needed. In another embodiment, the powering signal is generated making use of another system supported by the host device 110, such as EPCGlobal or GSM. Even in this case, it may be advantageous to perform the clock extraction at the host device 110, because it may problematic to conduct a signal in a frequency of the magnitude of 1 GHz to the communication transceiver 115.

The synchronisation channel may be a narrow band radio frequency channel such as a 13.56 MHz, 850 or 900 MHz radio channel. The communication channel may be a high-data rate communication radio channel such as an I-UWB channel. It should be appreciated that the terms synchronisation channel and communication channel are merely designating one use of these frequency bands without intention to reserve these radio frequencies solely for the synchronisation and communication functions. It will be appreciated that the synchronisation channel may be usable for providing the communication unit 120 with powering and/or a clock reference signal for use by the communication unit 120. It will also be appreciated that the communication channel may be used for exchanging synchronisation response signals from the communication unit 120 to the host device and after synchronisation phase for transmitting further information between the communication unit 120 and the host device 110.

The synchronisation transmitter 113 may further operate as a transmitter for another purpose e.g. for cellular communication system transmissions. In one embodiment, the antenna 114 may be multiplexed with another radio transmitter such as a cellular communication system transmitter.

The cellular communication system may be e.g. GSM, PDC or even a CDMA based system. In case of CDMA, the transmission may as such be suitable for powering proximate RFID communication unit due to substantially continuous transmission of the host device, provided that the proximate RFID communication units are sufficiently sensitive and/or the CDMA transmission is sufficiently powerful and narrow banded to enable sufficient power extraction.

The RFID communication unit 120 may comprise a processor or control circuitry 121 for generally controlling the operation of the RFID communication unit 120 according to computer program code that is adapted to control the operation of the RFID communication unit 120. A memory 122 stores the computer program code and may store a significant amount of digital content. The RFID communication unit 120 may further comprise a power unit such as a rectifier that is typically designed to amplify voltage received from the synchronisation channel 130 radio signal. An antenna 124 may be provided for receiving the synchronisation channel 130 signal and further a communication channel transceiver 125 and communication channel antenna 126 may be provided for transmitting and receiving radio signals to and from the host device 110 over the communication channel 140. A clock extraction unit 127 is provided for obtaining a clock reference from the reader 110. The clock extraction unit functionally detects radio signal cycles from the synchronisation channel.

It is appreciated that depending on embodiment, the RFID communication unit 120, for example an I-UWB tag may be either active, that is self powered, in which case reception of radio power is not needed for tag energising, or passive, in which case the received radio power is needed for energising the tag. In either case, however, the I-UWB tags according to different embodiments of the invention may be configured to obtain a timing reference from a received narrow band RFID signal or particularly from a substantially continuous part of such a signal. Hence, the I-UWB tag needs not have a local oscillator but can yet generate short pulses with timing accuracy of the order of one or more nanoseconds. An ISM band signal has a cycle of about 1.1 nanoseconds and lower frequencies such as 13.56 MHz may be up-converted so as to obtain a suitable timing accuracy for the I-UWB tag. It shall be appreciated that in this description, a tag communicating with the reader may alternatively refer to another reader, but the terms tag and communication unit are used in sake of simpler explaining of particular embodiments of the invention.

Basically, in some embodiments, the system enables wireless power transmission from a reader to an RFID communication unit by using a narrow-band signal and transferring communication data on another wider frequency band. This wider frequency band enables transfer of large amounts of data with a high data-rate using, for example, I-UWB transceivers. Particularly suitable frequency bands for wireless power transmission from the perspective of mobile phone integration are the frequency bands used by NFC (13.56 MHz) and 900 MHz UHF Industrial, Scientific and Medical (ISM) band used for example by EPCglobal RFID systems. It is appreciated that different applications or purposes call for different ranges and thus different frequencies may be more suitable in some embodiments of the invention. Depending on the applications desired for the mobile phone, a high data-rate (e.g. I-UWB based) RFID extension may be added on top of existing NFC reader functions and/or UHF RFID reader functions.

A high data-rate RFID tag may be capable of generating its supply voltage from several sources (by using widely known energy scavenging methods such as light, RF energy, vibration etc.). The default power source is an RF signal and the tag extracts the supply voltage from it by using rectifier circuitry. From high data-rate (I-UWB) communication perspective the tag needs a clock reference signal which is provided by the reader. The incoming narrow-band RF signal used for wireless power transmission can be used as a clock reference for I-UWB communication. Aforementioned 13.56 MHz and 900 MHz signals are well suited for that function. The tag may be adapted to using either one of the frequencies as available as a clock reference or it may be limited to use only one band to make the system simpler. As mentioned, the high data-rate RFID tag communicates with the reader over a wide-band air-interface such as I-UWB radio link. In addition to high data-rate transceiver, the tag typically includes a processor such as a digital signal processor, microprocessor, application specific integrated circuit or control logic circuitry and significant amount of memory for storing digital content for transferring over the high data-rate link.

It should be appreciated that the aforementioned examples on 13.56 MHz and 900 MHz are not intended as an exhaustive list, but other frequencies may equally or even additionally be used, when RFID tags of different frequencies are being simultaneously accessed. Further still, a multimode tag may be provided with capability to operate on NFC and EPC signal frequencies as well with 2.45 and/or 5 GHz signal frequencies.

It was disclosed in the foregoing that the host device 110 comprises a control processor 111 or an RFID sub-system which controls the functions and scheduling of different transceivers/transmitters needed for RFID communication. The control processor 111 may control these functions according to commands and requests received from an application engine (a normal part of present smart phones, not shown). The application engine may be configured, for example, to give a command that a narrow-band RFID scan/query procedure (e.g. NFC or EPCglobal) shall be executed periodically as a background process. If high data-rate RFID scan procedures are additionally requested, the control processor 111 may schedule the RFID functions to occur simultaneously that is so overlapping that at least different parts of parallel scanning procedure communications are sent either simultaneously or in an interlaced manner so that the scanning processes as a whole are at least partly overlapping. While the I-UWB communication uses different frequency band than the transmission of the synchronisation channel signal from the reader to narrow band tags and receiving of their responses, it is appreciated that it may not be possible to communicate with both narrow band and I-UWB tags, because the narrow band communication may prevent the I-UWB tags from gaining their clock signal that is necessary for the I-UWB communications.

As mentioned above, it is an objective of one embodiment to utilize resources of the host device 110 or typically of a mobile RFID reader efficiently. Depending on its configuration, the host device 110 or reader in short may be capable of reading RFID tags communicating according to legacy systems such as NFC and tags communicating over high data-rate air-interface which receive the supply voltage and clock reference from a narrow-band signal on e.g. 13.56 MHz frequency. Alternatively or additionally EPCglobal tags and high data-rate RFID tags may be powered by using the 900 MHz ISM band.

Figure 2:
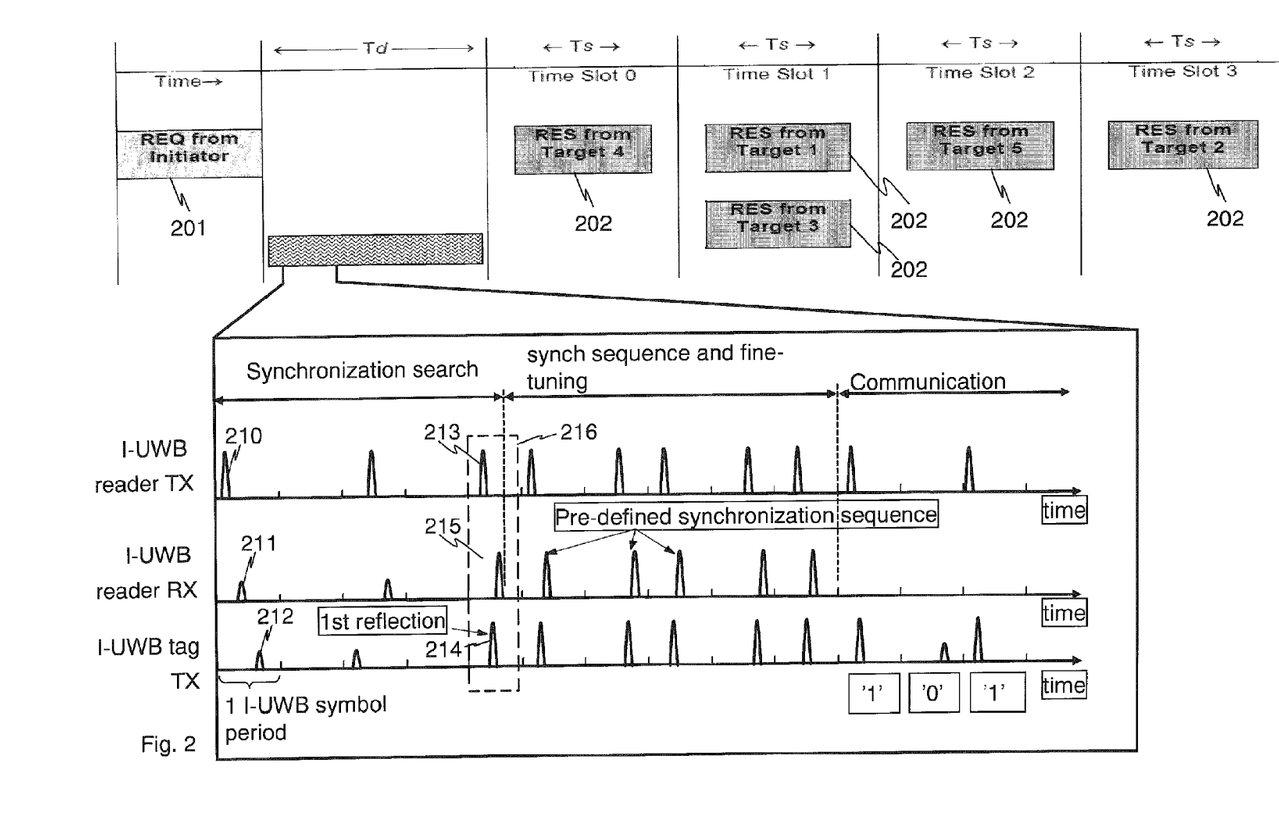
FIG. 2 shows a schematic drawing of exemplary time alignment of different signals when simultaneously scanning Near Field Communication (NFC) tags as specified in the NFCIP-1 protocol for data rates 212/414 kbit/s and Impulse Ultra Wide Band (I-UWB) tags.

FIG. 2 shows a schematic drawing of an exemplary time alignment of different signals when simultaneously scanning NFC tags as specified in the NFCIP-1 protocol for data rates 212/414 kbit/s and I-UWB tags. First, the host device sends an NFC REQ command 201 (REQ from initiator i.e. host device 110). The NFC tags send their responses 202 in time slots Ts that are selected randomly to avoid collisions (RES from an NFC tags). As further shown in FIG. 2, between the REQ command and the first response slot there is an idle period denoted as Td. During the idle period Td, neither the reader nor the NFC tags are transmitting information, but the reader must still keep on transmitting the CW signal active in order to energize the NFC tags. This idle period Td is used in an embodiment for high data-rate RFID communication. It should be noted that similar principles apply also to simultaneous scanning I-UWB tags and other NFC communication protocols, such as, for example NFCIP-2.

In FIG. 2 the reader 110 activates its I-UWB transceiver when time period Td is about to start. During this period, the initiator is detecting if any I-UWB tags reside within the communication range of the reader 110. The lowermost time-diagram in FIG. 2 presents the synchronization procedure according to an embodiment of the invention. The synchronization procedure is described with more detail in a co-pending application EP07119336 of the applicant of this patent application and EP07119336 is incorporated by reference for detailed description of the synchronization procedure. The first phase is called as frequency synchronization, not shown in FIG. 2. In the frequency synchronization phase, an I-UWB tag obtains a common clock reference with the reader so as to be able to better time its operation. The frequency synchronisation involves frequency synchronization of the reader (also often referred to as an initiator) and the I-UWB tag, and starting up of a voltage supplier of the I-UWB tag. Some of the operations of the frequency synchronisation phase may be executed already during REQ (from initiator) period.

A synchronization search phase follows after the frequency synchronisation phase. During this phase, the initiator attempts to detect reflected pulses from I-UWB tags within the communication range. In FIG. 2 the initiator transmits a first pulse 210 (see timeline labelled as I-UWB reader TX) and waits for an arriving reflection 211. The detection period of initiator and tag is presented on an adjacent timeline labelled as I-UWB reader RX as a small pulse since the detection period may cause emission of weak pulse 212 by the receiver. For emissions of the tag, see the third time line labelled as I-UWB tag TX. If the timing of transmitted reader pulse 213 and detection period of tag matches sufficiently well into a common period or window 216, the tag transmits a strong pulse 214 which is then detected by the initiator as a strong received pulse 215 (see the timeline of the reader RX). Whenever a reflection occurs and thus signs a coarse timing synchronisation, a verification that is a fine-tuning phase is next attempted.

Both devices (initiator and tag) move on to the fine-tuning phase when the first reflection occurs or sufficient number of detected reflections occur. In the fine tuning phase, the tag responds with a number of reflections. In the fine-tuning phase, the timing of pulses may be pre-defined according to a synchronization sequence.

It should be possible for an I-UWB system to achieve a synchronized communication state during the idle period Td. The NFCIP-1 standard specifies that the value of Td shall be 512×64/fc, where fc is the carrier frequency. Thus for 13.56 MHz operation, the absolute value of Td is approximately 2.4 ms which corresponds to 24000 symbols at a nominal data-rate of I-UWB system (10 Mbit/s).

It shall be appreciated that the time-diagram presented in FIG. 2 is exemplary for illustrating by means of a non-binding example how an embodiment of the invention may be used according to at least one embodiment. For instance, the number of symbol periods needed may vary from the one presented here.

Moreover, typically the synchronisation search phase lasts far longer than drawn in order to achieve an appropriate reflection with a sufficient probability. However, a basic assumption may be taken that the symbol duration of I-UWB radio lies within the scale of 100 ns. After a sufficient amount of successful consecutive reflections from a tag, the initiator and tag may start the communication phase. In the communication phase, the reader need not check for possible reflections unless for detecting keeping of synchronisation or ack/nack signals. This is indicated in FIG. 2 by not showing time offset pulses on the reader RX time line corresponding to the tag's time line.

Figure 3:
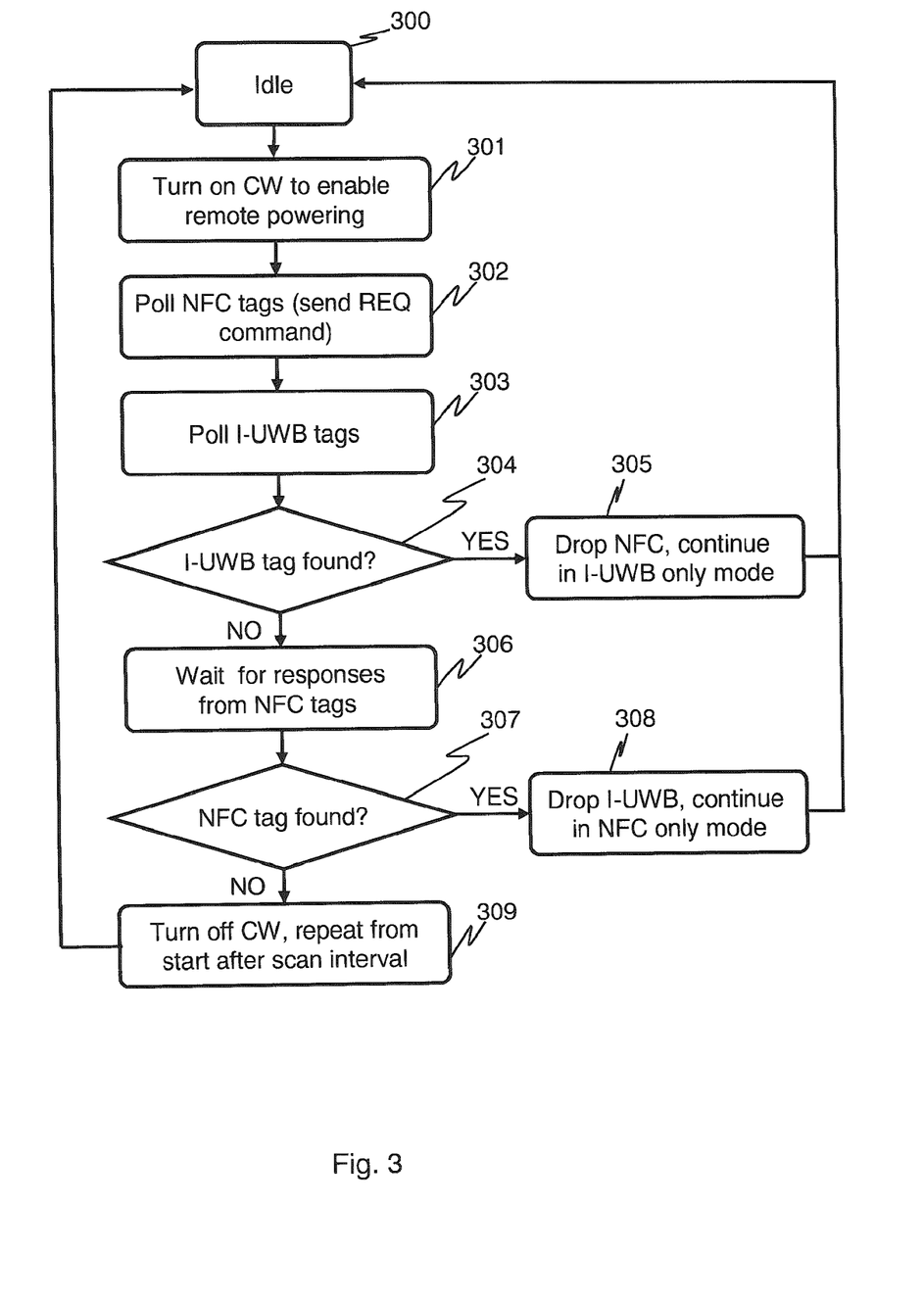
FIG. 3 shows an exemplary flow-chart for scheduling a narrow-band NFC interrogation and high data-rate RFID interrogation according to at least one embodiment.

An exemplary flow-chart for scheduling a narrow-band NFC interrogation and high data-rate RFID interrogation according to at least one embodiment is presented in FIG. 3. The flow chart starts from a state in which the host device 110 or RFID reader idles in terms of RFID functions or processes its other processes. RFID reader first receives a command from a control layer such as the application engine (see FIG. 1). According to the command, the system activates transmission of CW signal 301 which may power up narrow-band tags and high data-rate RFID tags in the vicinity of the reader. According to the time-diagram presented in FIG. 2, the reader sends 302 a request to narrow-band NFC tags (REQ from initiator) to poll for proximate NFC tags. After that the transmission contains a CW period Td as mentioned above. During that time high data-rate RFID (I-UWB) transceiver may scan 303 for tags capable of high data-rate communication. The reader next checks 304 whether any I-UWB tags were found. If some high data-rate RFID tags are found during the CW period the reader may ignore the responses from narrow-band tags and switch off the NFC receiver 305, unless both I-UWB and NFC tags should be searched. Moreover, in an embodiment it may be further checked (not shown) whether found I-UWB tag does not require a narrow-band radio transmission in which case the narrow band transmission may be switched off in order to reduce power consumption of the reader. However, if no high data-rate RFID tags are found during the CW period the reader may continue to wait 306 for responses from narrow-band tags and check 307 if any NFC tags were found. If yes, the high data-rate RFID transceiver may be switched off 308 so as to only continue with NFC communications. On the other hand, if no tags where found during the interrogation period, the reader may turn off the CW transmission 309 and resume to idle 300 until next scan will be performed. From narrow-band or high data-rate RFID communication states the reader may enter the idle state as soon as the communication has been finalized. In an embodiment the reader repeats the interrogation of high data-rate RFID tags during the narrow-band communication whenever suitable periods exist in narrow-band signalling.

It is appreciated based on the foregoing that in certain embodiments of the invention, it is possible that the communication over high data-rate RFID radio link as well as responses from NFC tags are received simultaneously. In spite of the narrow-band modulation, the high data-rate RFID system may utilize the narrow-band signal as the clock reference for high data-rate communication over I-UWB radio link. Some limitations may arise from the used narrow-band modulation method (ASK vs. PSK). For example, on-off keying based amplitude modulation may be problematic from the perspective of I-UWB radio link since the I-UWB transceiver may need a continuous clock reference and such an amplitude modulation may induce gaps in transmission of I-UWB signals which hinder the usage of signal also as a clock reference of I-UWB communication.

It is also appreciated that a similar procedure as presented in FIG. 3 is usable with the RFID functions operating according to EPCglobal standard on a 900 MHz band by employing CW periods in the signal, for example.

Figure 4:
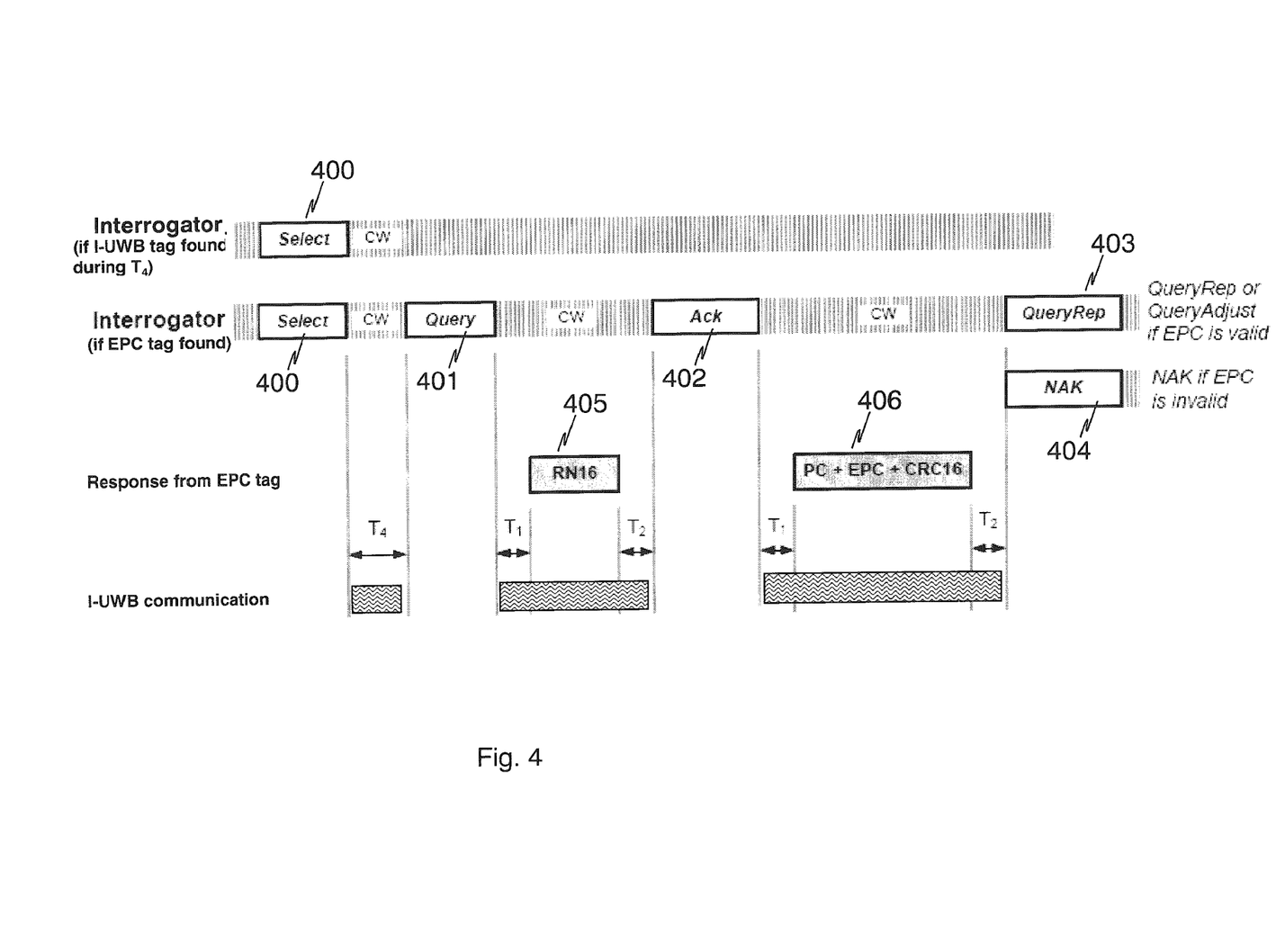
FIG. 4 illustrates an exemplary scanning procedure that is usable for searching EPCGlobal tags according to at least one embodiment

FIG. 4 illustrates exemplary scanning procedure that is usable for EPC tags (the second time-line from top to bottom). In this embodiment, the reader initiates the scanning by sending a SELECT command 400, which is used to select the tags that will take part in the next inventory round (in the first interrogation round it's common that all the tags within the communication range are requested to response). Next, the reader must reserve a delay before sending a following QUERY command 401. The minimum delay between SELECT and QUERY commands is denoted as T4 in the timing diagram. During this period, there is no communication going on between the reader and EPC tag, but the CW signal is active. The CW period is suitable to use also for energizing and as a clock reference for high data-rate tags. The control processor 111 or RFID sub-system should activate the I-UWB transceiver during this time period. If no high data rate tags have been found, the normal EPC interrogation may proceed after the QUERY command 401 by the reader sending an ACK message 402 if a response 405 has been received from an EPC tag, sending a QUERYREP or QUERYADJUST message 403 (known from EPC standard) if a following message 406 has been received or sending a NACK message 404 if the following message 406 is invalid (e.g. erroneous CRC16 checksum). The procedure of I-UWB communication is similar to the one presented for NFC+I-UWB combination in connection with FIG. 2. However, if an I-UWB tag is found during T4, the interrogator may ignore responses from EPC tags and continue transmission of CW signal and I-UWB communication after T4 as is indicated by the uppermost time-line in FIG. 4. In this case, there are no gaps caused into communicating with I-UWB tags due to scanning and communicating with EPC tags as is indicated by an extending pattern filled line that continues also after T4.

The high data-rate I-UWB tag may be also configured to get synchronization information from the interrogation signal transmitted on the first frequency. In other words, instead of using the signal on first frequency only for receiving of supply power and/or clock reference to the tag, the tag may be capable of detecting the information transferred on the first frequency (like the REQ from initiator, 201, in FIG. 2, and Select sequence, 400, in FIG. 4) in one embodiment of the invention. This feature may be used to synchronize the I-UWB transmission more efficiently with the CW (or other suitable) periods of the signal transmitted on the first frequency.

The timing requirements specified in the EPCGlobal UHF Generation 2 standard imply that the absolute minimum value for T4 is between 31.25-125 μs, depending on the used data rate. Note that the standard only specifies a minimum value for T4, the reader device may freely extend this period as needed. In addition, other CW periods exist in the EPCglobal transmission also after Query period, as shown by patterns on the lowermost line (I-UWB communication level) in FIG. 4. The latter CW periods are even longer than the first one, and it should be noticed that the modulated signal from narrow-band tags is relatively weak thus not likely to interfere the usage of the CW signal from the reader as a clock reference for high data-rate communication. Narrow-band and high data-rate states may be terminated similarly as was explained in connection with the NFC related flow-chart example described in the foregoing (FIG. 3).

The present EPCGlobal standard mainly uses ASK modulation for the communications from the reader to the tag. This means that the transmitted signal contains gaps or at least large amplitude variation (depending on modulation parameters). Therefore, the modulated periods in an EPCGlobal interrogation signal may not be suited for use as a clock reference for high data-rate I-UWB communication since gaps of 2-6 us are likely to be too long and frequency synchronization between the reader and the tag might be lost during those periods. Therefore, scheduling of high data-rate RFID interrogation and communication may be aligned with the CW periods of EPCGlobal interrogation signal. Additionally, PSK and FSK interrogator to tag periods which are used in other standards (for example ISO18000-6 Type B forward link uses bi-phase modulation) may be used as clock reference for I-UWB communication since phase variation due to modulation (on 200 kHz channel) is negligible from the perspective of I-UWB communication.

The control processor 111 may also be configured to inform other functions in the host device 110 about a time slot that is reserved for high data-rate RFID operation. Alternatively, the control processor 111 may be configured to select the channel used for high data-rate RFID powering such that another system (like RFID reader operating according to EPCglobal standard) may execute the interrogation process simultaneously with the upcoming high data-rate RFID function. The modulation of a UHF signal (e.g. PSK) may be allowed if it does not affect the operation of high data-rate RFID system.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising a radio unit configured to transmit:
   a first radio signal on a first frequency band in order to interrogate first communication units compatible to a first radio frequency identification system; and
   a second radio signal on a second frequency band in order to interrogate second communication units compatible to a second radio frequency identification system, the second radio frequency band being different from the first frequency band;
   wherein the first radio signal is configured to provide a clock reference for the second communication units by continuously powering periods of the first radio signal so as to synchronize the second communication units with the apparatus in terms of timing synchronized with the first radio signal transmission frequency and the radio unit is further configured to interrogate the first and second communication units substantially simultaneously.

2. An apparatus according to claim 1, wherein the radio unit is configured to send the second signal during periods in which the first radio signal is substantially continuous.

3. An apparatus according to claim 2, wherein the substantially continuously signal refers to non-modulated or substantially continuous intermediate periods between individual communication periods in which different signals are being sent to or received from the first radio frequency identification communication units.

4. An apparatus according to claim 1, wherein the second interrogation is configured to synchronize the second communication units and the apparatus in terms of communication frequency.

5. An apparatus according to claim 1, wherein the first radio frequency identification system is configured to use amplitude shift keying modulation for communication unit interrogation and to provide periods of constant wave transmission as intermediate periods.

6. An apparatus according to claim 1, wherein the first radio frequency identification system is a near field communication system.

7. A method in an apparatus, comprising:
   transmitting a first radio signal on a first frequency band in order to interrogate first communication units compatible to a first radio frequency identification system;
   transmitting a second radio signal on a second frequency band in order to interrogate second communication units compatible to a second radio frequency identification system, the second radio frequency band being different from the first frequency band; and
   performing substantially simultaneously the interrogating of the first and second communication units;
   wherein the first radio signal is configured to provide a clock reference for the second communication units by continuously powering periods of the first radio signal so as to synchronize the second communication units with the apparatus in terms of timing synchronized with the first radio signal transmission frequency.

8. A method according to claim 7, wherein the second radio signal is sent during periods in which the first radio signal is substantially continuous.

9. A method according to claim 8, wherein the substantially continuous radio signal refers to a non-modulated signal or a signal transmitted during intermediate periods between individual communication periods in which different signals are being sent to or received from the first radio frequency identification communication units.

10. A computer program product comprising a non-transitory computer-readable medium having computer executable program code stored thereon, which when executed by a processor causes an apparatus to perform a method according to claim 7.

11. An apparatus, comprising:
   a first radio block configured to receive from a first frequency band a first radio signal comprising first radio signal cycles, which first radio signal being a narrowband interrogation signal for radio identification communication units compatible to a first radio frequency identification system;

a clock extractor configured to produce from the narrowband interrogation signal a timing reference synchronized with the first radio signal cycles;

a second radio block configured to receive from a second frequency band a second radio signal, the second radio signal being an interrogation signal for radio identification communication units compatible to a second radio frequency identification system; wherein the first radio signal is configured to provide a clock reference for the second communication units by continuously powering periods of the first radio signal so as to synchronize the second communication units with the apparatus in terms of timing synchronized with the first radio signal transmission frequency;

wherein the second radio block is further configured to process the second interrogation signal during the receiving of the first interrogation signal and the producing of the timing reference.

12. An apparatus according to claim 11, wherein the clock extractor is configured to extract the timing reference from the first radio signal during periods in which the first radio signal is substantially continuous.

13. An apparatus according to claim 12, wherein the substantially continuous radio signal refers to a non-modulated signal or a signal transmitted during intermediate periods between individual communication periods in which different signals are being sent to or received from the first radio frequency identification communication units.

14. An apparatus according to claim 11, wherein the first radio block is configured to determine from the narrowband interrogation information the timing of a substantially continuous period in the first radio signal and to enable the second radio block for the determined substantially continuous period.

15. An apparatus according to claim 11, wherein the second radio frequency band is different from the first frequency band.

16. A method in an apparatus, comprising:

receiving from a first frequency band a first radio signal comprising first radio signal cycles, which first radio signal being a narrowband interrogation signal for radio identification communication units compatible to a first radio frequency identification system;

producing from the narrowband interrogation signal a timing reference synchronized with the first radio signal cycles;

receiving from a second frequency band a second radio signal, the second radio signal being an interrogation signal for radio identification communication units compatible to a second radio frequency identification system; wherein the first radio signal is configured to provide a clock reference for the second communication units by continuously powering periods of the first radio signal so as to synchronize the second communication units with the apparatus in terms of timing synchronized with the first radio signal transmission frequency; and processing the second interrogation signal while receiving the first interrogation signal and producing the timing reference.

17. A method according to claim 16, further comprising extracting the timing reference from the first radio signal during periods in which the first radio signal is substantially continuous.

18. A method according to claim 17, wherein the substantially continuous radio signal refers to a non-modulated signal or a signal transmitted during intermediate periods between individual communication periods in which different signals are being sent to or received from the first radio frequency identification communication units.

19. A computer program product comprising a non-transitory computer-readable medium having computer executable program code stored thereon, which when executed by a processor causes an apparatus to perform a method according to claim 16.

20. An apparatus, comprising:

means for transmitting a first radio signal on a first frequency band in order to interrogate first communication units compatible to a first radio frequency identification system;

means for transmitting a second radio signal on a second frequency band in order to interrogate second communication units compatible to a second radio frequency identification system, the second radio frequency band being different from the first frequency band, wherein the first radio signal is configured to provide a clock reference for the second communication units by continuously powering periods of the first radio signal so as to synchronize the second communication units with the apparatus in terms of timing synchronized with the first radio signal transmission frequency; and means for performing substantially simultaneously the interrogating of the first and second communication units.

* * * * *